US012246333B2

(12) United States Patent
Liang et al.

(10) Patent No.: US 12,246,333 B2
(45) Date of Patent: Mar. 11, 2025

(54) ALL-PLASTIC TRIGGER SPRAY PUMP

(71) Applicant: MAJESTY HOLDINGS CO., LTD., Zhongshan (CN)

(72) Inventors: Peihui Liang, Zhongshan (CN); Maoyong Zhu, Zhongshan (CN); Yonglei Zhang, Zhongshan (CN); Jun Li, Zhongshan (CN)

(73) Assignee: MAJESTY HOLDINGS CO., LTD. (CN)

( * ) Notice: Subject to any disclaimer, the term of this patent is extended or adjusted under 35 U.S.C. 154(b) by 43 days.

(21) Appl. No.: 17/799,600

(22) PCT Filed: Oct. 20, 2020

(86) PCT No.: PCT/CN2020/122165
§ 371 (c)(1),
(2) Date: Aug. 12, 2022

(87) PCT Pub. No.: WO2022/052217
PCT Pub. Date: Mar. 17, 2022

(65) Prior Publication Data

US 2023/0226567 A1 Jul. 20, 2023

(30) Foreign Application Priority Data

Sep. 8, 2020 (CN) ......................... 202010931822.7

(51) Int. Cl.
*B05B 11/00* (2023.01)
*B05B 11/10* (2023.01)

(52) U.S. Cl.
CPC ...... *B05B 11/1057* (2023.01); *B05B 11/0029* (2013.01); *B05B 11/0032* (2013.01);
(Continued)

(58) Field of Classification Search
CPC ............. B05B 11/1057; B05B 11/0032; B05B 11/007; B05B 11/1011; B05B 11/1047;
(Continued)

(56) References Cited

U.S. PATENT DOCUMENTS 6,869,027 B2 * 3/2005 Foster ................. B05B 11/1011 239/398
9,307,871 B2 * 4/2016 McNulty .................. A47K 5/14
(Continued)

FOREIGN PATENT DOCUMENTS

CN 2772630 Y 4/2006
CN 203789807 U 8/2014
(Continued)

OTHER PUBLICATIONS

China National Intellectual Property Administration (ISA/CN), International Search Report, PCT/CN2020/122165, Jun. 15, 2021, Beijing, China.

*Primary Examiner* — Frederick C Nicolas
(74) *Attorney, Agent, or Firm* — Bochner PLLC; Andrew D Bochner; Eric R Kleinertz

(57) ABSTRACT

A full-plastic trigger spray pump, wherein a lower part of the pump body is connected to a locking cover, a liquid spray channel is in the pump body, a nozzle is provided at an outlet of the liquid spray channel, a liquid outlet channel is communicated with the liquid spray channel, a liquid guide chamber is provided on the liquid outlet channel and a liquid inlet channel, the upper part of the liquid guide chamber is in communication with the liquid outlet channel by a normally open port, a pumping piston is in the liquid guide chamber, a trigger capable of driving the pumping piston is hinged onto the pump body, an elastic arm capable of driving the trigger is provided thereon, a lateral one-way valve adapted to open during the return movement of the
(Continued)

pumping piston enables the liquid guide chamber to communicate with the liquid inlet channel.

9 Claims, 9 Drawing Sheets

(52) U.S. Cl.
CPC ............ *B05B 11/007* (2013.01); *B05B 11/10* (2023.01); *B05B 11/1011* (2023.01); *B05B 11/1042* (2023.01); *B05B 11/1047* (2023.01); *B05B 11/1069* (2023.01); *B05B 11/1077* (2023.01)

(58) Field of Classification Search
CPC ............. B05B 11/1077; B05B 11/0029; B05B 11/1069; B05B 11/10; B05B 11/1042
See application file for complete search history.

(56) References Cited

U.S. PATENT DOCUMENTS

| | | | | |
|---|---|---|---|---|
| 9,962,724 | B2 * | 5/2018 | Fujiwara | B05B 11/1002 |
| 11,596,960 | B2 * | 3/2023 | Sweeton | B05B 11/1069 |
| 2017/0176177 | A1 * | 6/2017 | Takesue | G01B 9/02097 |

FOREIGN PATENT DOCUMENTS

| | | | |
|---|---|---|---|
| CN | 104755178 | A | 7/2015 |
| CN | 105620892 | A | 6/2016 |
| CN | 105642470 | A | 6/2016 |
| CN | 106029514 | A | 10/2016 |
| CN | 212830207 | U | 3/2021 |
| JP | 2016140784 | A | 8/2016 |

* cited by examiner

ALL-PLASTIC TRIGGER SPRAY PUMP

TECHNICAL FIELD

The invention relates to an all-plastic trigger spray pump.

BACKGROUND

In the existing trigger spray pump, generally a one-way valve is arranged in a liquid inlet channel. When the liquid is inletting, a pumping piston expands outwards to make a liquid guide chamber bigger and generate negative pressure. Then, a liquid inlet channel generates negative pressure through a communication port between the liquid guide chamber and the liquid inlet channel, and then the one-way valve is opened, so that the liquid enters the liquid inlet channel and then enters the liquid guide chamber through the communication port. Because of the negative pressure generated by the liquid guide chamber, the liquid inlet channel needs to generate negative pressure through the communication port before the one-way valve is opened and the liquid enters due to the pressure difference between the liquid inlet channel and a suction pipe, affecting the efficiency of liquid inflow. When a trigger is actuated, solution flows from the liquid guide chamber to the liquid inlet channel through the communication port, and the one-way valve can only be closed when the pressure in the liquid inlet channel reaches a certain value. Before closing, part of the solution will flow back into the suction pipe or bottle, reducing the effective utilization rate of the solution pumped into the liquid guide chamber via a pump.

The invention has been made in light of this situation.

SUMMARY

The invention aims to overcome the shortcomings of the prior art and provides an all-plastic trigger spray pump, which has the characteristic of simple structure, high efficiency of liquid inflow and full utilization of the solution pumped into the liquid guide chamber via a pump.

The invention is realized by the following technical solution.

An all-plastic trigger spray pump, comprising a pump body, wherein a lower part of the pump body is connected to a locking cover; a liquid spray channel is provided in the pump body; a nozzle is provided at an outlet of the liquid spray channel; a liquid outlet channel and a liquid inlet channel which are vertically isolated from each other are provided in the pump body; the liquid outlet channel is communicated with the liquid spray channel; a liquid guide chamber is provided on a side of the liquid outlet channel and the liquid inlet channel; an upper part of the liquid guide chamber is always in communication with the liquid outlet channel by means of a normally open port; a pumping piston is provided in the liquid guide chamber; a trigger capable of driving the pumping piston to do piston movement in a left-right direction in the liquid guide chamber is hinged onto the pump body; an elastic arm capable of pressing against the pump body and driving the trigger to return the pumping piston back is provided on the trigger; a lateral one-way valve that can be opened during the return movement of the pumping piston so as to enable the liquid guide chamber to be communicated with the liquid inlet channel is provided between the liquid guide chamber and the liquid inlet channel.

According to the all-plastic trigger spray pump as described above, the lateral one-way valve comprises a T-shaped valve plug, which comprises a fixed shaft and an elastic valve plate; a convex ring located on one side of the fixed shaft is provided at the edge of the valve plate; a shaft hole and a communication hole that enables the liquid guide chamber to be communicated with the liquid inlet channel are provided on the pump body; the shaft hole and the communication hole are located inside the convex ring; the fixed shaft is fixed to the shaft hole; a flat bottom opposite to the convex ring is provided on the rightmost side of the liquid guide chamber; the convex ring abuts on the flat bottom under the elastic action of the valve plate to achieve sealing.

According to the all-plastic trigger spray pump as described above, there are a plurality of communication holes arranged around an outer side of the shaft hole; the communication holes and the shaft hole are communicated into a whole and form a plum blossom hole structure; a ridge that protrudes towards one side of the valve plate and is supported on the right side of the valve plate is provided between two adjacent communication holes; and a communication chamber always in communication with the communication holes is formed among the flat bottom, the convex ring, the valve plate and the ridge.

According to the all-plastic trigger spray pump as described above, the pumping piston comprises a piston rod, and a primary one-way sealing ring and an secondary one-way sealing ring arranged outside the piston rod; the primary one-way sealing ring is arranged at the right end of the piston rod; the secondary one-way sealing ring is arranged on the left side of the primary one-way sealing ring; the primary one-way sealing ring and the secondary one-way sealing ring form a left-and-right dual-sealing structure with an inner wall of the liquid guide chamber; an annular groove with a notch facing to the right is provided between the primary one-way sealing ring and the piston rod; a positioning ring that protrudes to the left in the liquid guide chamber is provided on the rightmost side of the liquid guide chamber; the positioning ring surrounds the valve piston inside and is opposite to the annular groove in a left-right direction; the positioning ring is provided with a gap corresponding to the normally open port.

According to the all-plastic trigger spray pump described above, the liquid spray channel is arranged at a certain angle relative to the liquid outlet channel, and an inlet of the liquid spray channel is arranged in the middle of the liquid outlet channel; a longitudinal one-way valve that only allows liquid to flow from the liquid outlet channel to the liquid spray channel is provided between the liquid outlet channel and the liquid spray channel; the longitudinal one-way valve comprises an elastic telescopic part located on an upper part of the liquid outlet channel; the elastic telescopic part is hollow, and is provided with a rim on an upper end thereof facing outside; a shell is connected to the pump body; a collar sleeved outside the liquid outlet channel from top to bottom is provided on the shell; a press ring for pressing an upper end of the longitudinal one-way valve so as to press the rim against the edge of an upper port of the liquid outlet channel is provided on the shell and inside the collar; the rim sealingly connects the press ring with the upper port of the liquid outlet channel; a movable part capable of moving in the liquid outlet channel up and down is connected below the elastic telescope part; a circular ring is provided at a lower end of the movable part; a circular hole for the circular ring to be inserted into to realize sealing connection is provided on the liquid outlet channel and above the normally open port; a step capable of blocking the circular ring from below is provided at the bottom of the circular hole; the elastic telescopic part elastically presses the movable part downwards to enable the circular ring to be inserted into the circular hole; an inner hole is provided in the longitudinal one-way valve; a positioning rod inserted downwards into the inner hole and capable of pressing against the bottom of the inner hole from above when the movable part moves upwards so as to limit a rising height of the movable part is provided on the shell.

According to the all-plastic trigger spray pump as described above, a one-way sealing ring located above the inlet of the liquid spray channel is provided on an upper end of the movable part; the one-way sealing ring is sealingly connected with the liquid outlet channel; two or more clearances are circumferentially provided on a lateral face of the elastic telescopic part.

According to the all-plastic trigger spray pump as described above, the elastic telescopic part has a howl-shaped structure.

According to the all-plastic trigger spray pump as described above, a circular joint is provided at the outlet of the liquid spray channel; the nozzle is sleeved outside the joint and is rotatable relative to the joint; a protruding buckle is provided on an outer lateral face of the joint; a groove for the buckle to snap into and preventing the nozzle from escaping from the joint is provided in the nozzle; the groove is an arc groove arranged around the joint and allows the buckle to rotate a certain angle therein; a liquid outlet communicated with the liquid spray channel is provided on the joint; the nozzle is provided with a sealing connection ring inserted into the liquid outlet and sealingly connected with an inner wall of the liquid outlet; a blocking mechanism capable of blocking the liquid jet after the nozzle rotates a certain angle is provided between the nozzle and the liquid outlet.

According to the all-plastic trigger spray pump as described above, the blocking mechanism comprises a sleeve column located inside the sealing connection ring, and a central column arranged at the liquid outlet and extending into the sleeve column; a first recess communicated with an outlet of the nozzle is provided on an inner most side of the sleeve column; a second recess communicated with the liquid outlet is provided on an inner sidewall of the sleeve column; a third recess capable of communicating the first recess with the second recess is provided on the central column; the nozzle is rotated to make the second recess misalign with the third recess so as to block the communication between the first recess and the second recess.

According to the all-plastic trigger spray pump as described above, the elastic arm and the trigger are integrally molded by injection; there are two elastic arms located at the left and right sides of the pump body respectively; the elastic arm has an upwards-protruding curved structure; a hook is provided at a rear end of the elastic arm; a hook groove matched with the hook is provided at the rear of the pump body.

Compared with the prior art, the invention has the following advantages.

1. The parts and components of the trigger spray pump of the invention are all made of plastic, which is environment-friendly and safe. The corrosive problem caused by the use of metal members such as a metal spring is avoided, which is environment-friendly and safe. The European Union recycling standards can be better met, and the resource reuse rate is increased.
2. Due to the arrangement of the lateral one-way valve between the liquid guide chamber and the liquid inlet channel, when the pumping piston moves outwards, the volume of the liquid guide chamber becomes larger, and negative pressure is generated and directly acts on the lateral one-way valve to open the lateral one-way valve, so that the liquid in a bottle enters the liquid guide chamber through a suction pipe and the liquid inlet channel, and thus the efficiency of liquid inflow is high. When the trigger is actuated, the solution in the liquid guide chamber can quickly push the lateral one-way valve to close, so as to prevent the liquid from flowing back into the bottle. Moreover, by adopting a normally open port to make the liquid guide chamber always in communication with the liquid outlet channel, the explosive force of the solution flowing from the liquid guide chamber to the liquid outlet channel can be increased when the trigger is actuated.
3. There are a plurality of communication holes arranged around an outer side of the shaft hole to form a plum blossom hole structure; a ridge supported on the right side of the valve plate is provided between two adjacent communication holes; and a communication chamber always in communication with the communication holes is formed among the flat bottom, the convex ring, the valve plate and the ridge. The communication chamber is communicated with the bottle in the normal use process and is filled with liquid. When the negative pressure generated in the liquid guide chamber reaches a set value, the liquid from the communication holes around the fixed shaft impacts the valve plate from the periphery, then the convex ring separates from the flat bottom and opens the channel instantly, so that the liquid can quickly enter the liquid guide chamber from all around. When the trigger is actuated, the liquid passed can quickly push the valve plate to make the convex ring press on the flat bottom, so as to prevent the liquid from flowing back.
4. The pumping piston has a dual-sealing structure, which enhances the sealing performance and can effectively solve the problem of liquid overflow from a vent hole.
5. The longitudinal one-way valve adopts the sealing design of full contact of the circular periphery of the circular ring and the circular hole. The elastic telescopic part is made of highly elastic material. When the trigger is actuated to make the internal liquid pressure reach the design value, the channel will be instantly opened to achieve explosive spraying effect; and when it is closed, an instant closing effect can be achieved, which ensures the sealing stability and improves the quantitation accuracy. Moreover, the movable part is blocked by the positioning rod, and the height of the circular ring being pushed up is limited, which can not only ensure that the channel is open enough for the liquid to be sprayed out, but also enable the circular ring to be inserted into the circular hole in time and quickly to close the channel after finishing the spray, so as to prevent backflow.
6. The nozzle adopts a rotating self-locking design, which is convenient to use, stable in function and high in assembly efficiency.
7. The trigger and the elastic arm are integrally molded by injection, which is simple in structure, reduces parts and components, reduces manufacturing cost, and improves assembly efficiency.

BRIEF DESCRIPTION OF THE DRAWINGS

The specific implementation of the invention will be further described in detail with reference to the accompanying drawings, in which.

DETAILED DESCRIPTION

Figure 1:
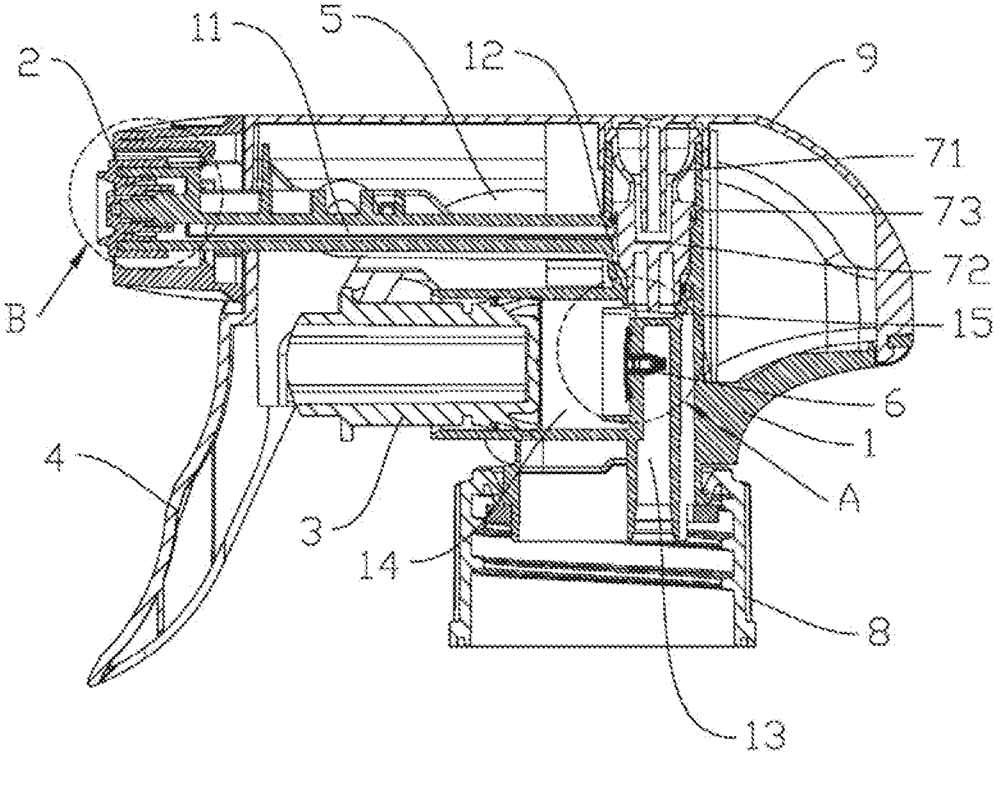
FIG. 1 is a sectional view of an embodiment of an all-plastic trigger spray pump of the invention.

The invention will be further described below with reference to the accompanying drawings.

As shown in FIGS. 1 to 9, an all-plastic trigger spray pump comprises a pump body 1. The lower part of the pump body 1 is connected with a locking cover 8, which is used for connecting with a bottle. A liquid spray channel 11 is provided in the pump body 1. A nozzle 2 is provided at an outlet of the liquid spray channel 11. A liquid outlet channel 12 and a liquid inlet channel 13 which are vertically isolated from each other are provided in the pump body 1, wherein the liquid outlet channel 12 is communicated with the liquid spray channel 11. A liquid guide chamber 14 is provided on a side of the liquid outlet channel 12 and the liquid inlet channel 13. The upper part of the liquid guide chamber 14 is always in communication with the liquid outlet channel 12 by means of a normally open port 15. A pumping piston 3 is provided in the liquid guide chamber 14. A trigger 4 capable of driving the pumping piston 3 to perform piston movement in a left-right direction in the liquid guide chamber 14 is hinged onto the pump body 1. An elastic arm 5 capable of pressing against the pump body 1 and driving the trigger 4 to return the pumping piston 3 back is provided on the trigger 4. A lateral one-way valve that can be opened during the return movement of the pumping piston 3 so as to enable the liquid guide chamber 14 to be communicated with the liquid inlet channel 13 is provided between the liquid guide chamber 14 and the liquid inlet channel 13.

The liquid inlet channel 13 is used to communicate with a suction pipe inserted into the bottle. By arranging the lateral one-way valve between the liquid guide chamber 14 and the liquid inlet channel 13, when the trigger 4 is bounced by the elastic arm 5 to make the pumping piston 3 move outwards, the volume of the liquid guide chamber 14 becomes larger, and negative pressure is generated and directly acts on the lateral one-way valve to open the lateral one-way valve, so that the liquid in the bottle enters the liquid guide chamber 14 through the suction pipe and the liquid inlet channel 13, and thus the efficiency of liquid inflow is high. When the trigger 4 is actuated, driven by the pumping piston 3, the solution in the liquid guide chamber 14 can quickly push the lateral one-way valve to close, so as to prevent the liquid from flowing back into the bottle. By adopting the normally open port 15 to make the liquid guide chamber 14 always in communication with the liquid outlet channel 12, the explosive force of the solution flowing from the liquid guide chamber 14 to the liquid outlet channel 12 can be increased when the trigger 4 is actuated, which is beneficial to improve the explosive force of the spray.

According to the embodiments shown in FIGS. 1, 2, 6 and 8, the lateral one-way valve comprises a T-shaped valve plug 6. The valve plug 6 is made of a high-strength elastic material. The valve plug 6 comprises a fixed shaft 61 and an elastic valve plate 62, A convex ring 63 located on one side of the fixed shaft 61 is provided at the edge of the valve plate 62. A shaft hole 16 and a communication hole 17 enabling the liquid guide chamber 14 to be communicated with the liquid inlet channel 13 is provided on the pump body 1. The shaft hole 16 and the communication hole 17 are located inside the convex ring 63. The fixed shaft 61 is fixed to the shaft hole 16. A flat bottom 140 opposite to the convex ring 63 is provided on the rightmost side of the liquid guide chamber 14. The convex ring 63 abuts on the flat bottom 140 under the elastic action of the valve plate 62 to achieve sealing. It has good sealing performance, and is simple in structure and is easy to manufacture.

Figure 2:
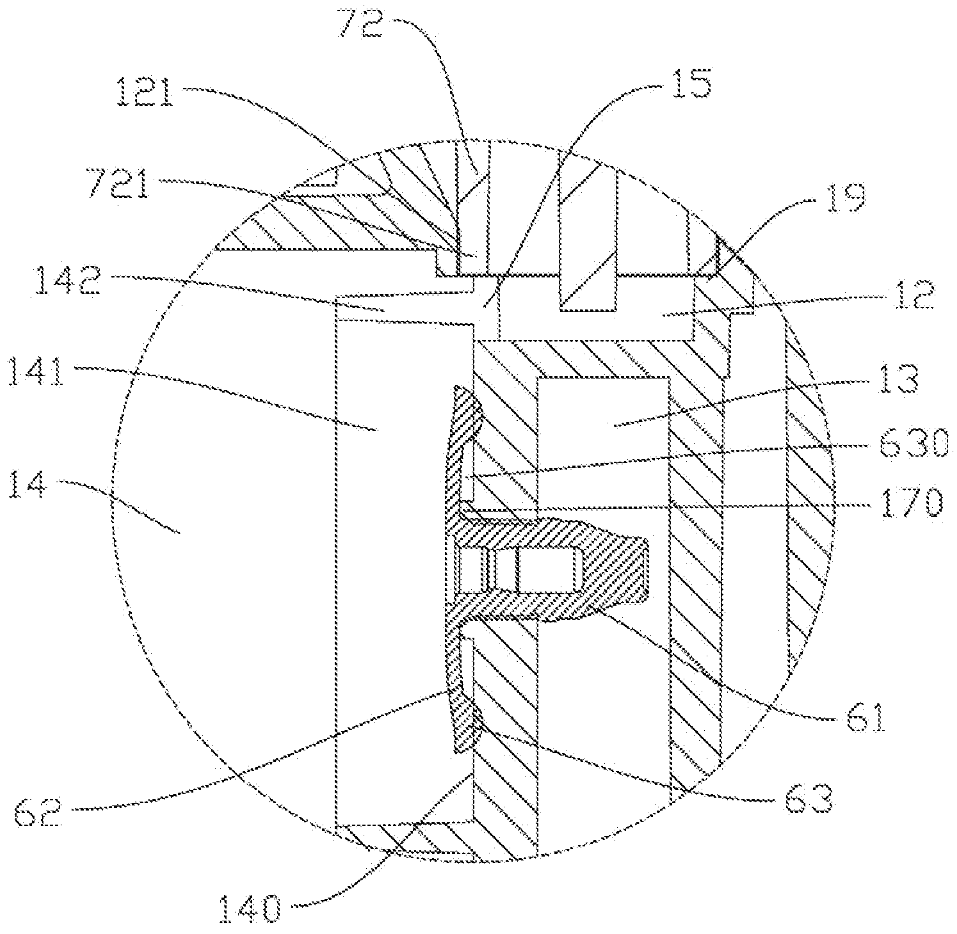
FIG. 2 is a partial enlarged view of part A of FIG. 1.
Figure 5:
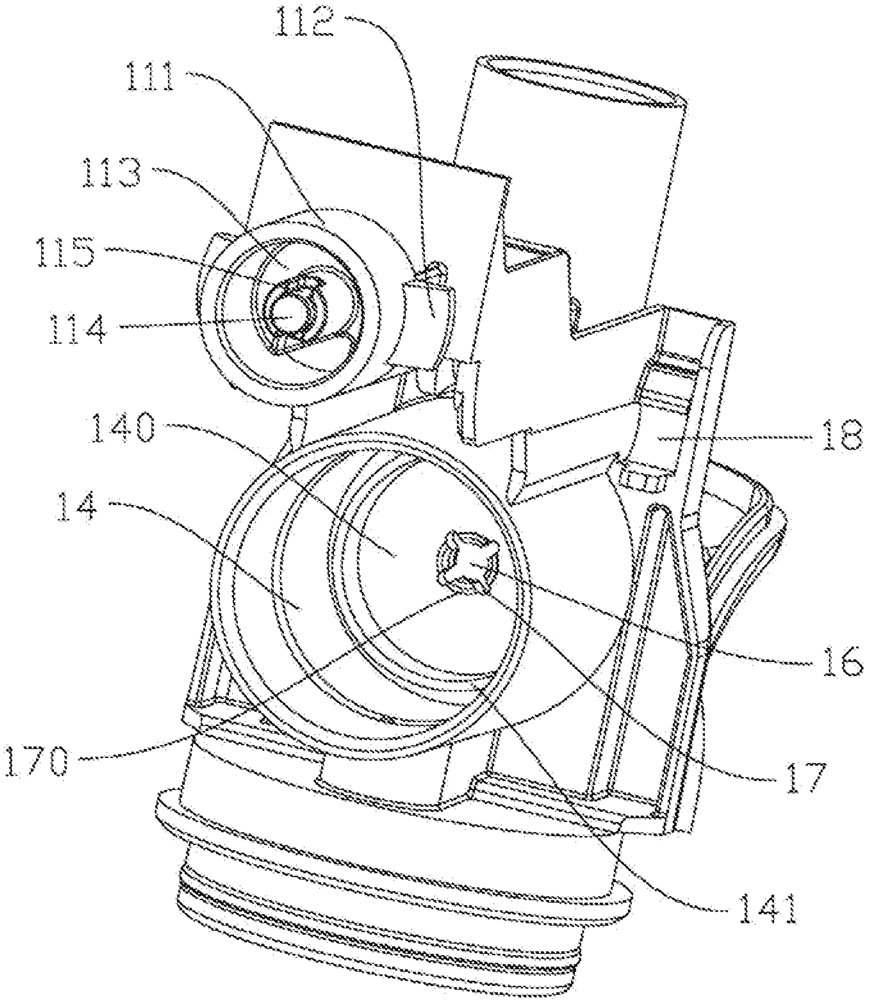
FIG. 5 is a structural schematic view of a pump body.

According to the embodiment shown in FIG. 5, there are a plurality of communication holes 17 arranged around an outer side of the shaft hole 16, and the communication holes 17 and the shaft hole 16 are communicated into a whole and form a plum blossom hole structure. It is simple in structure and simplifies the molding die. As shown in FIG. 2, a ridge 170 that protrudes towards one side of the valve plate 62 and is supported on the right side of the valve plate 62 is provided between two adjacent communication holes 17, and a communication chamber 630 always in communication with the communication holes 17 is formed among the flat bottom 140, the convex ring 63, the valve plate 62 and the ridge 170. The communication chamber 630 communicates with the bottle and is filled with liquid during normal use. When the negative pressure generated in the liquid guide chamber 14 reaches a set value, the liquid from the communication holes 17 around the fixed shaft 61 impacts the valve plate 62 from the periphery, then the convex ring 63 separates from the flat bottom 140 and opens the channel instantly, so that the liquid can quickly enter the liquid guide chamber 14 from all around. When the trigger 4 is actuated, the liquid passed can quickly push the valve plate 62 to make the convex ring 63 press on the flat bottom 140, so as to prevent the liquid from flowing back.

Figure 6:
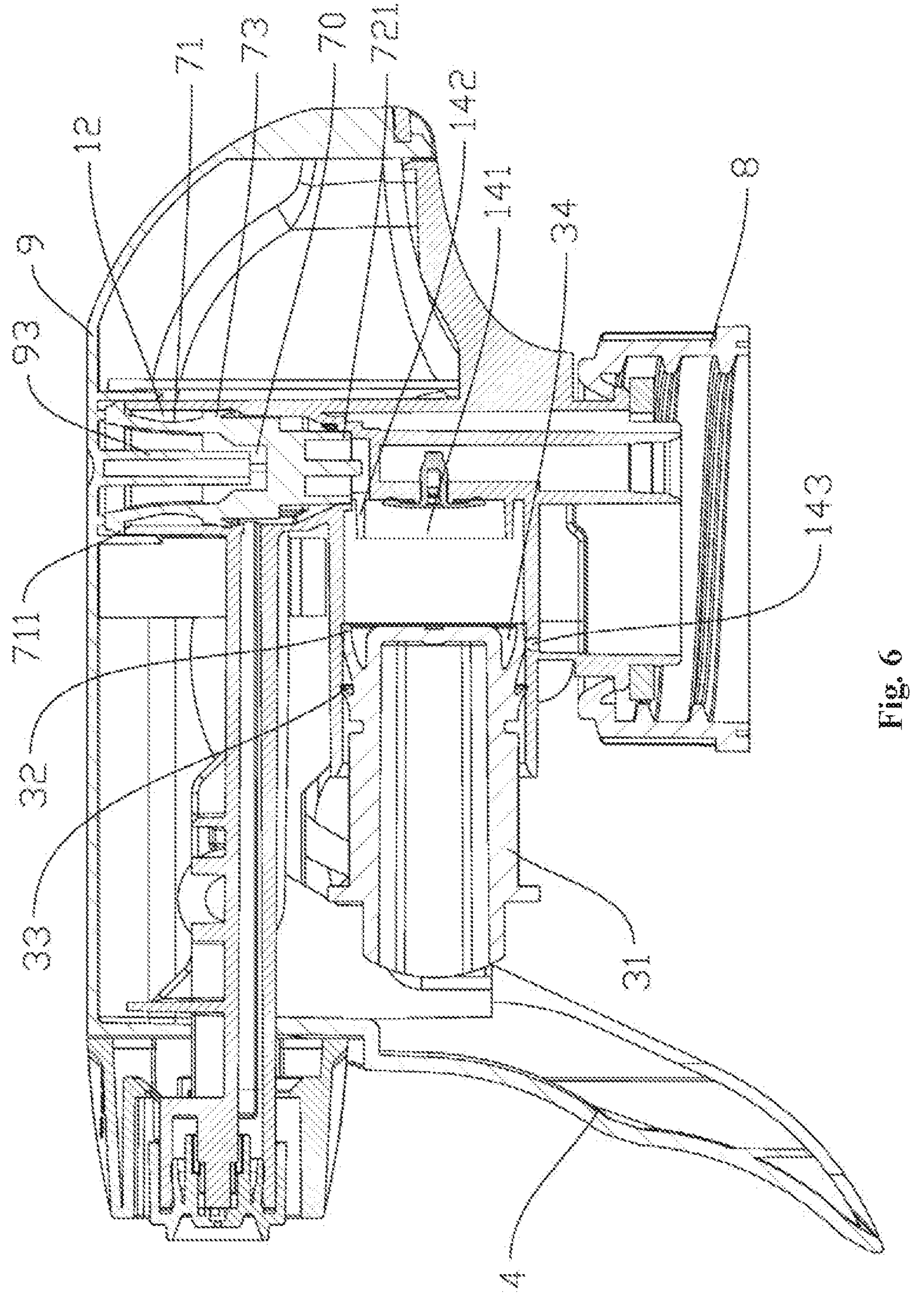
FIG. 6 is a sectional view of a second embodiment of an all-plastic trigger spray pump of the invention.
Figure 8:
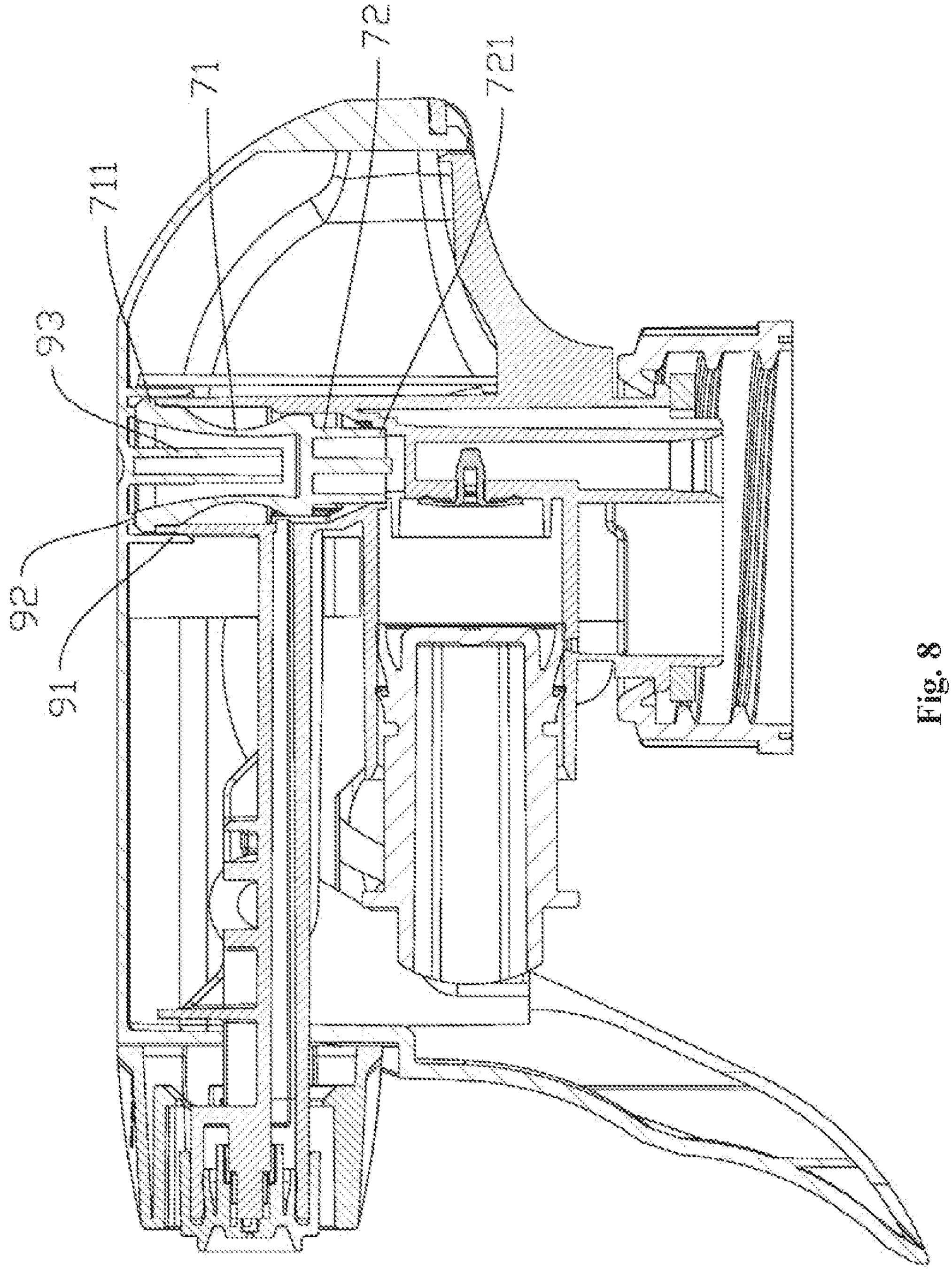
FIG. 8 is a sectional view of a third embodiment of an all-plastic trigger spray pump of the invention.

According to the embodiments shown in FIGS. 1, 6 and 8, the pumping piston 3 comprises a piston rod 31, and a primary one-way sealing ring 32 and a secondary one-way sealing ring 33 arranged outside the piston rod 31. The primary one-way sealing ring 32 is arranged at the right end of the piston rod 31. The secondary one-way sealing ring 33 is arranged on the left side of the primary one-way sealing ring 32. The primary one-way sealing ring 32 and the secondary one-way sealing ring 33 form a left-and-right dual-sealing structure with the inner wall of the liquid guide chamber 14. Moreover, when the trigger 4 is bounced, the secondary one-way sealing ring 33 is located on the left side of a vent hole 143, while the primary one-way sealing ring 32 is located on the right side of the vent hole 143, which can effectively solve the problem of liquid overflow from the vent hole 143 while enhancing the sealing performance. The vent hole 143 communicates with the inner side of the locking cover 8 and the left part of the liquid guide chamber 14. When the trigger 4 is actuated, the secondary one-way sealing ring 33 moves to the right side of the vent hole 143, so that the vent hole communicates with the outside air through the chamber opening of the liquid guide chamber 14.

An annular groove 34 with a notch facing to the right is provided between the primary one-way sealing ring 32 and the piston rod 31. A positioning ring 141 that protrudes to the left into the liquid guide chamber 14 is provided on the rightmost side of the liquid guide chamber 14. The positioning ring 141 surrounds the valve piston 6 inside and is opposite to the annular groove 34 in a left-right direction. The positioning ring 141 is provided with a gap 142 corresponding to the normally open port 15. When the trigger 4 is actuated, the positioning ring 141 can be inserted into the annular groove 34 to squeeze out the liquid in the annular groove 34, and the right end of the piston rod 31 is inserted into the positioning ring 141, so as to squeeze out the liquid in the liquid guide chamber 14 as much as possible, and thus the utilization rate is improved.

According to the embodiments shown in FIGS. 1 to 9, the liquid spray channel 11 is arranged at a certain angle relative to the liquid outlet channel 12, and an inlet of the liquid spray channel 11 is arranged in the middle of the liquid outlet channel 12. A longitudinal one-way valve 7 that only allows liquid to flow from the liquid outlet channel 12 to the liquid spray channel 11 is arranged between the liquid outlet channel 12 and the liquid spray channel 11. The longitudinal one-way valve 7 comprises an elastic telescopic part 71 located on the upper part of the liquid outlet channel 12. The elastic telescopic part 71 is hollow, and is provided with a rim 711 on an upper end thereof facing outside. A shell 9 is connected to the pump body 1. A collar 91 sleeved outside the liquid outlet channel 12 from top to bottom is provided on the shell 9. A press ring 92 for pressing an upper end of the longitudinal one-way valve 7 so as to tightly press the rim 711 against the edge of an upper port of the liquid outlet channel 12 is provided on the shell 9 and inside the collar 91. The rim 711 sealingly connects the press ring 92 with the upper port of the liquid outlet channel 12. A movable part 72 capable of moving in the liquid outlet channel 12 up and down is connected below the elastic telescope part 71. A circular ring 721 is provided at a lower end of the movable part 72. A circular hole 121 for the circular ring 721 to be inserted into to realize sealing connection is provided on the liquid outlet channel 12 and above the normally open port 15. A step 19 capable of blocking the circular ring 721 from below is provided at the bottom of the circular hole 121. The elastic telescopic part 71 elastically presses the movable part 72 downwards to enable the circular ring 721 to be inserted into the circular hole 121. An inner hole 70 is provided in the longitudinal one-way valve 7. A positioning rod 93 inserted downwards into the inner hole 70 and capable of pressing against the bottom of the inner hole 70 from above when the movable part 72 moves upwards so as to limit a rising height of the movable part 72 is provided on the shell 9.

By adopting the sealing design of full contact of the circular periphery of the circular ring 721 and the circular hole 121, and adopting highly elastic material to make the elastic telescopic part 71, when the trigger 4 is actuated to make the internal liquid pressure reach the design value, the channel will be instantly opened to achieve explosive spraying effect; and when it is closed, an instant closing effect can be achieved, which ensures the sealing stability and improves the quantitation accuracy. Moreover, the movable part 72 is blocked by the positioning rod 93 to limit the height of the circular ring 721 being pushed up, which can not only ensure that the channel is open enough for the liquid to be sprayed out, but also enable the circular ring 721 to be inserted into the circular hole 121 in time and quickly to close the channel after finishing the spray, so as to prevent backflow.

Figure 4:
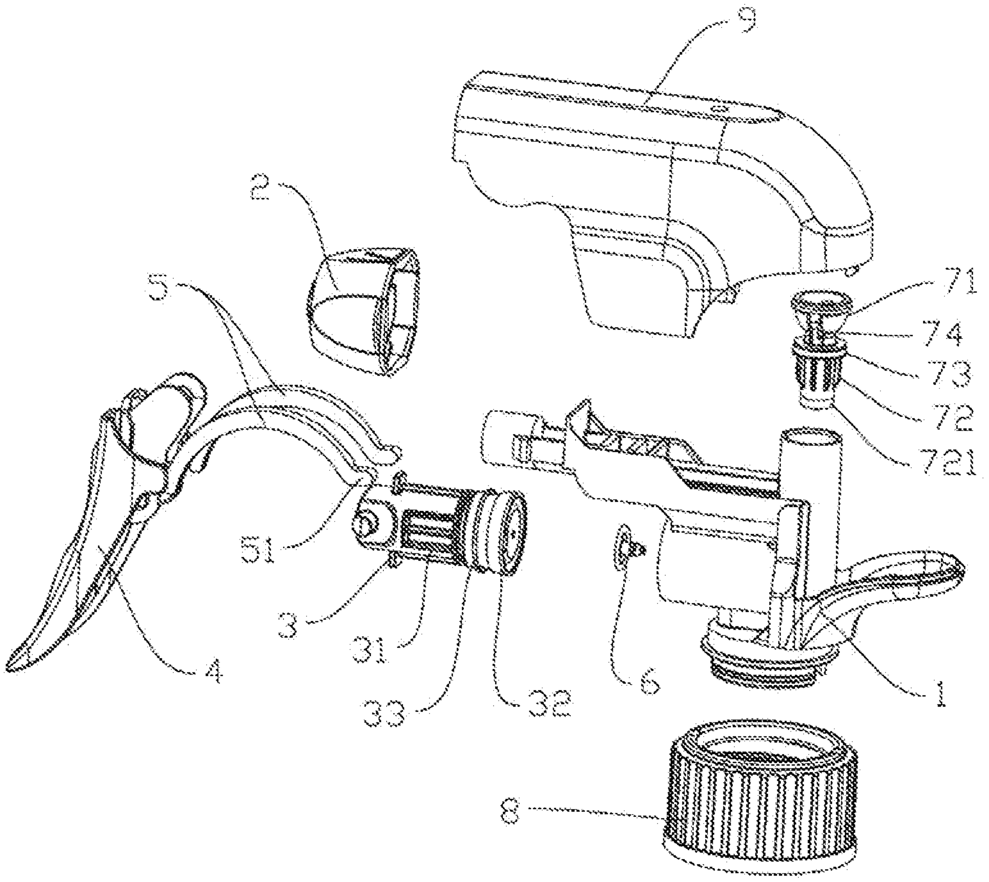
FIG. 4 is an exploded view of a second embodiment of a longitudinal one-way valve of the invention.
Figure 7:
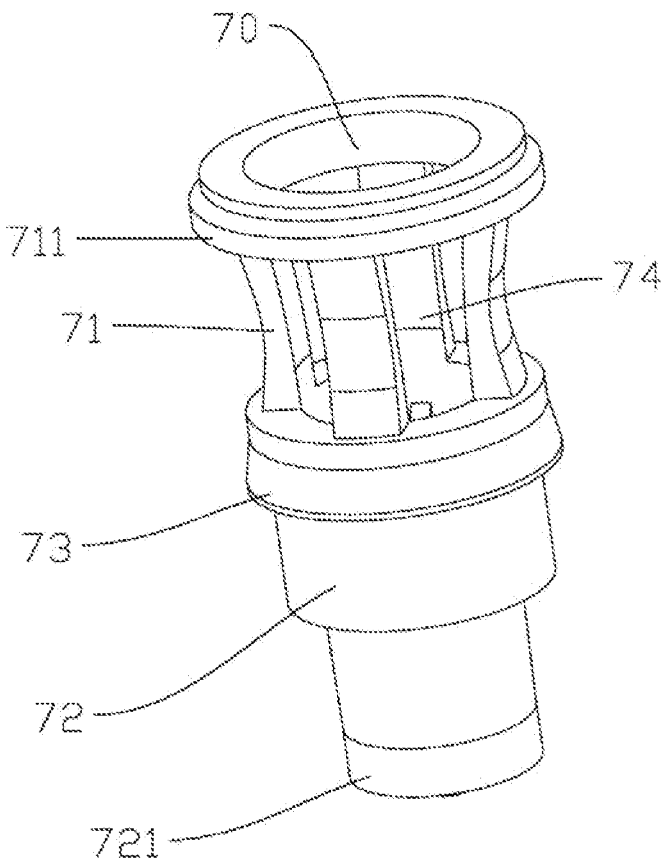
FIG. 7 is a structural schematic view of a longitudinal one-way valve corresponding to the embodiment in FIG. 6.

According to the embodiments shown in FIGS. 1 and 4, and the embodiments shown in FIGS. 6 and 7, as two implementations of the longitudinal one-way valve 7, a one-way sealing ring 73 located above the inlet of the liquid spray channel 11 is provided on an upper end of the movable part 72. The one-way sealing ring 73 is sealingly connected with the liquid outlet channel 12. Two or more clearances 74 are provided on the lateral face of the elastic telescopic part 71 in the circumferential direction. The elasticity of the elastic telescopic part 71 can be adjusted by the design of the clearances 74, and with the dual-sealing structure of the one-way sealing ring 73 and the rim 711, the sealing performance is enhanced, and the liquid overflow is effectively prevented.

According to the embodiment shown in FIG. 4, the elastic telescopic part 71 has a bowl-shaped structure, and two clearances 74 are arranged on the lateral face of the elastic telescopic part 71 in the circumferential direction, so that the driving force required for its initial contraction deformation is small, and it is easy to be pushed up by the solution from below to communicate the liquid outlet channel 12 with the liquid spray channel 11. Moreover, when the movable part 72 moves upwards to deform the elastic telescopic part 71 by a certain amount, it can have better elasticity, so that it can quickly rebound and push the movable part 72 to return back when the negative pressure is reduced.

Figure 9:
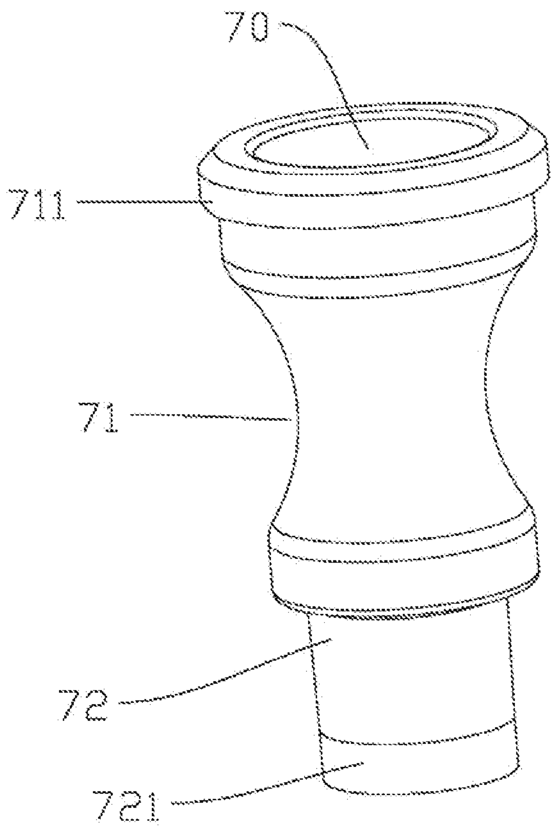
FIG. 9 is a structural schematic view of a longitudinal one-way valve corresponding to the embodiment in FIG. 8.

According to the embodiment shown in FIGS. 8 and 9, as a third implementation of the longitudinal one-way valve 7, the middle part of the elastic telescopic part 71 is concave from the lateral face, and the sidewall of the elastic telescopic part 71 has an integrated annular structure, which has high elasticity and can rebound rapidly.

Figure 3:
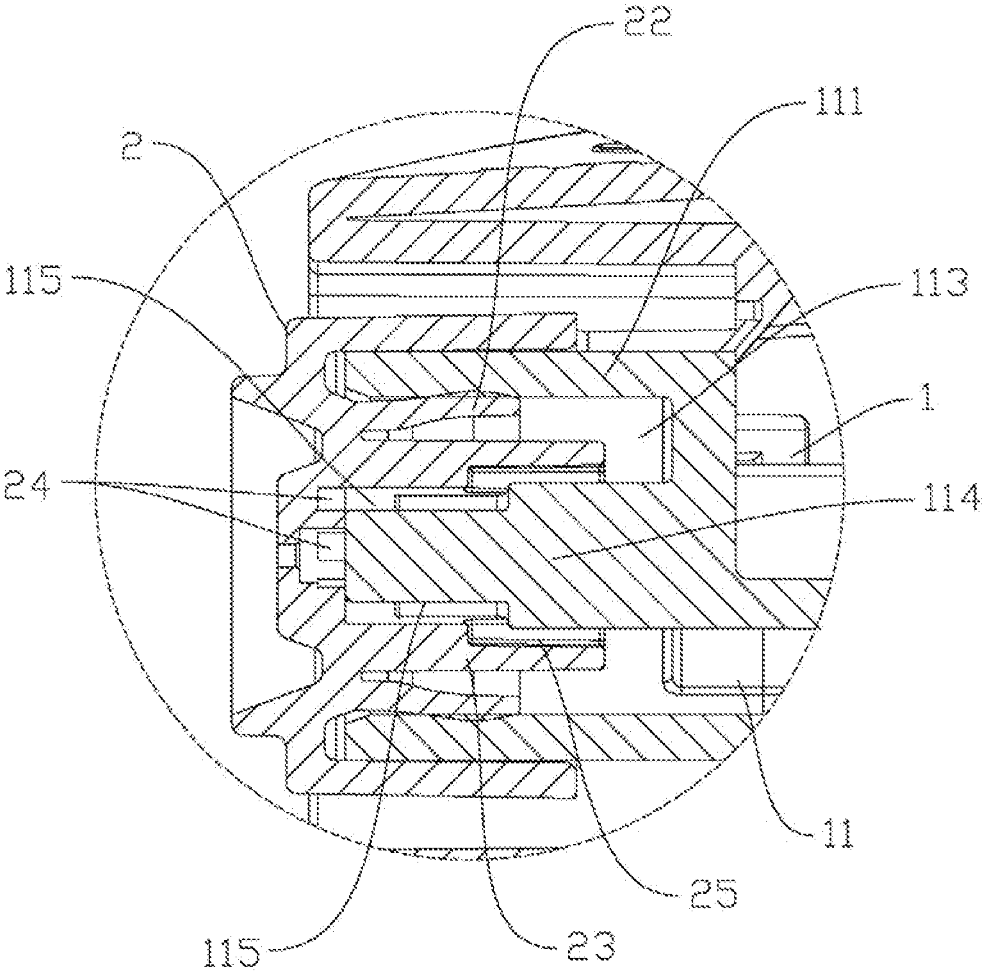
FIG. 3 is a partial enlarged view of part B of FIG. 1.

According to the embodiment shown in FIGS. 3 and 5, a circular joint 111 is provided at the outlet of the liquid spray channel 11. The nozzle 2 is sleeved outside the joint 111 and is rotatable relative to the joint 111. A protruding buckle 112 is provided on an outer lateral face of the joint 111. A groove for the buckle 112 to snap into and preventing the nozzle 2 from escaping from the joint 111 is provided in the nozzle 2. The groove is an arc groove arranged around the joint 111 and allows the buckle 112 to rotate a certain angle therein. A liquid outlet 113 communicated with the liquid spray channel 11 is provided on the joint 111. The nozzle 2 is provided with a sealing connection ring 22 inserted into the liquid outlet 113 and sealingly connected with an inner wall of the liquid outlet 113. A blocking mechanism capable of blocking the liquid jet after the nozzle 2 rotates a certain angle is provided between the nozzle 2 and the liquid outlet 113, so that in non-use state no liquid comes out when the trigger is actuated by mistake, and the rotation self-locking is realized.

The blocking mechanism comprises a sleeve column 23 located inside the sealing connection ring 22, and a central column 114 arranged at the liquid outlet 113 and extending into the sleeve column 23, A first recess 24 communicated with an outlet of the nozzle 2 is provided at the inner most side of the sleeve column 23. A second recess 25 communicated with the liquid outlet 113 is provided on the inner sidewall of the sleeve column 23. A third recess 115 capable of communicating the first recess 24 with the second recess 25 is provided on the central column 114. The nozzle 2 is rotated to make the second recess 25 misalign with the third recess 115 so as to block the communication between the first recess 24 and the second recess 25, thus blocking the outflow of the liquid. The nozzle 2 is rotated to make the second recess 25 align with the third recess 115 and the first recess 24 to realize communication, which is simple and convenient to operate.

According to the embodiment shown in FIG. 4, the elastic arm 5 and the trigger 4 are integrally molded by injection. There are two elastic arms 5 located on the left and right sides of the pump body 1 respectively. The elastic arms 5 have an upwards-protruding curved structure. A book 51 is provided at the rear end of the elastic arm 5. A hook groove 18 matched with the hook 51 is provided at the rear part of the pump body 1. It is simple in structure, reduces parts and components, reduces manufacturing cost, and improves assembly efficiency.

The parts and components of the full-plastic trigger spray pump are all made of plastic, which is environment-friendly and safe, avoiding the corrosive problem caused by the use of metal. Among others, the valve plug 6 and the longitudinal one-way valve 7 are made of PE material, while the pump body 1, the nozzle 2, the pumping piston 3, the trigger 4, the elastic arm 5, the locking cover 8 and the shell 9 are made of PP material, which is environment-friendly and safe. The European Union recycling standards can be better met, and the resource reuse rate is increased.

What is claimed is:

1. An all-plastic trigger spray pump, characterized by comprising a pump body (1), wherein a lower part of the pump body (1) is connected with a locking cover (8); a liquid spray channel (11) is provided in the pump body (1); a nozzle (2) is provided at an outlet of the liquid spray channel (11); a liquid outlet channel (12) and a liquid inlet channel (13) which are vertically isolated from each other are provided in the pump body (1); the liquid outlet channel (12) is communicated with the liquid spray channel (11); a liquid guide chamber (14) is provided on a side of the liquid outlet channel (12) and the liquid inlet channel (13); an upper part of the liquid guide chamber (14) is always in communication with the liquid outlet channel (12) by means of a normally open port (15); a pumping piston (3) is provided in the liquid guide chamber (14); a trigger (4) capable of driving the pumping piston (3) to do piston movement in a left-right direction in the liquid guide chamber (14) is hinged onto the pump body (1); an elastic arm (5) capable of pressing against the pump body (1) and driving the trigger (4) to return the pumping piston (3) back is provided on the trigger (4); a lateral one-way valve that can be opened during the return movement of the pumping piston (3) so as to enable the liquid guide chamber (14) to be communicated with the liquid inlet channel (13) is provided between the liquid guide chamber (14) and the liquid inlet channel (13), wherein the lateral one-way valve comprises a T-shaped valve plug (6), which comprises a fixed shaft (61) and an elastic valve plate (62); a convex ring (63) located on one side of the fixed shaft (61) is provided at an edge of the valve plate (62); a shaft hole (16) and a communication hole (17) enabling the liquid guide chamber (14) to be communicated with the liquid inlet channel (13) are provided on the pump body (1); the shaft hole (16) and the communication hole (17) are located inside the convex ring (63); the fixed shaft (61) is fixed to the shaft hole (16); a flat bottom (140) opposite to the convex ring (63) is provided on a rightmost side of the liquid guide chamber (14); the convex ring (63) abuts on the flat bottom (140) under elastic action of the valve plate (62) to achieve sealing.

2. The all-plastic trigger spray pump according to claim 1, characterized in that there are a plurality of communication holes (17) arranged around all outer side of the shaft hole (16); the communication holes (17) and the shaft hole (16) are communicated into a whole and form a plum blossom hole structure, a ridge (170) that protrudes towards one side of the valve plate (62) and is supported on a right side of the valve plate (62) is provided between two adjacent communication holes (17); and a communication chamber (630) always in communication with the communication holes (17) is formed among the flat bottom (140), the convex ring (63), the valve plate (62) and the ridge (170).

3. The all-plastic trigger spray pump according to claim 2, characterized in that the pumping piston (3) comprises a piston rod (31), and a primary one-way sealing ring (32) and an secondary one-way sealing ring (33) arranged outside the piston rod (31); the primary one-way sealing ring (32) is arranged at a right end of the piston rod (31); the secondary one-way sealing ring (33) is arranged on a left side of the primary one-way sealing ring (32); the primary one-way sealing ring (32) and the secondary one-way sealing ring (33) form a left-and-right dual-sealing structure with an inner wall of the liquid guide chamber (14); an annular groove (34) with a notch facing to the right is provided between the primary one-way sealing ring (32) and the piston rod (31); a positioning ring (141) that protrudes to the left in the liquid guide chamber (14) is provided on the rightest side of the liquid guide chamber (14); the positioning ring (141) surrounds the valve plug (6) inside and is opposite to the annular groove (34) in a left-right direction; the positioning ring (141) is provided with a gap (142) corresponding to the normally open port (15).

4. The all-plastic trigger spray pump according to claim 1, characterized in that the liquid spray channel (11) is arranged at a certain angle relative to the liquid outlet channel (12), and an inlet of the liquid spray channel (11) is arranged in the middle of the liquid outlet channel (12); a longitudinal one-way valve (7) that only allows liquid to flow from the liquid outlet channel (12) to the liquid spray channel (11) is provided between the liquid outlet channel (12) and the liquid spray channel (11); the longitudinal one-way valve (7) comprises an elastic telescopic part (71) located on an upper part of the liquid outlet channel (12); the elastic telescopic part (71) is hollow, and is provided with a rim (711) on an upper end thereof facing outside; a shell (9) is connected with the pump body (1); a collar (91) sleeved outside the liquid outlet channel (12) from top to bottom is provided on the shell (9); a press ring (92) for pressing an upper end of the longitudinal one-way valve (7) so as to tightly press the rim (711) against an edge of an upper port of the liquid outlet channel (12) is provided on the shell (9) and inside the collar (91); the rim (711) sealingly connects the press ring (92) with the upper port of the liquid outlet channel (12); a movable part (72) capable of moving in the liquid outlet channel (12) up and down is connected below the elastic telescope part (71); a circular ring (721) is provided at a lower end of the movable part (72); a circular hole (121) for the circular ring (721) to be inserted into to realize sealing connection is provided on the liquid outlet channel (12) and above the normally open port (15); a step (19) capable of blocking the circular ring (721) from below is provided at the bottom of the circular hole (121); the elastic telescopic part (71) elastically presses the movable part (72) downwards to enable the circular ring (721) to be inserted into the circular hole (121); an inner hole (70) is provided in the longitudinal one-way valve (7); a positioning rod (93) inserted downwards into the inner hole (70) and capable of pressing against the bottom of the inner hole (70)

from above when the movable part (72) moves upwards so as to limit a rising height of the movable part (72) is provided on the shell (9).

5. The all-plastic trigger spray pump according to claim 4, characterized in that a one-way sealing ring (73) located above the inlet of the liquid spray channel (11) is provided on an upper end of the movable part (72); the one-way sealing ring (73) is sealingly connected with the liquid outlet channel (12); two or more clearances (74) are circumferentially provided on a lateral face of the elastic telescopic part (71).

6. The all-plastic trigger spray pump according to claim 5, characterized in that the elastic telescopic part (71) has a bowl-shaped structure.

7. The all-plastic trigger spray pump according to claim 1, characterized in that a circular joint (111) is provided at the outlet of the liquid spray channel (11); the nozzle (2) is sleeved outside the joint (111) and is rotatable relative to the joint (111); a protruding buckle (112) is provided on an outer lateral face of the joint (111); a groove for the buckle (112) to snap into and preventing the nozzle (2) from escaping from the joint (111) is provided in the nozzle (2); the groove is an arc groove arranged around the joint (111) and allows the buckle (112) to rotate a certain angle therein; a liquid outlet (113) communicated with the liquid spray channel (11) is provided on the joint (111); the nozzle (2) is provided with a sealing connection ring (22) that is inserted into the liquid outlet (113) and sealingly connected with an inner wall of the liquid outlet (113); a blocking mechanism capable of blocking the liquid jet after the nozzle (2) rotates a certain angle is provided between the nozzle (2) and the liquid outlet (113).

8. The all-plastic trigger spray pump according to claim 7, characterized in that the blocking mechanism comprises a sleeve column (23) located inside the sealing connection ring (22), and a central column (114) arranged at the liquid outlet (113) and extending into the sleeve column (23); a first recess (24) communicated with an outlet of the nozzle (2) is provided on an inner most side of the sleeve column (23); a second recess (25) communicated with the liquid outlet (113) is provided on an inner sidewall of the sleeve column (23); a third recess (115) capable of communicating the first recess (24) with the second recess (25) is provided on the central column (114); the nozzle (2) is rotated to make the second recess (25) misalign with the third recess (115) so as to block the communication between the first recess (24) and the second recess (25).

9. The all-plastic trigger spray pump according to claim 1, characterized in that the elastic arm (5) and the trigger (4) are integrally molded by injection; there are two elastic arms (5) located at left and right sides of the pump body (1) respectively; the elastic arm (5) has an upwards-protruding curved structure; a hook (51) is provided at a rear end of the elastic arm (5); a hook groove (18) matched with the hook (51) is provided at the rear of the pump body (1).

* * * * *